June 14, 1960   H. R. BILLETER   2,940,460
LIQUID FLOW CONTROL DEVICES
Filed Nov. 6, 1956   3 Sheets-Sheet 1

Inventor
Henry Robert Billeter
by Fidler, Cruse & Beveridge
atty's.

June 14, 1960  H. R. BILLETER  2,940,460
LIQUID FLOW CONTROL DEVICES
Filed Nov. 6, 1956  3 Sheets-Sheet 2
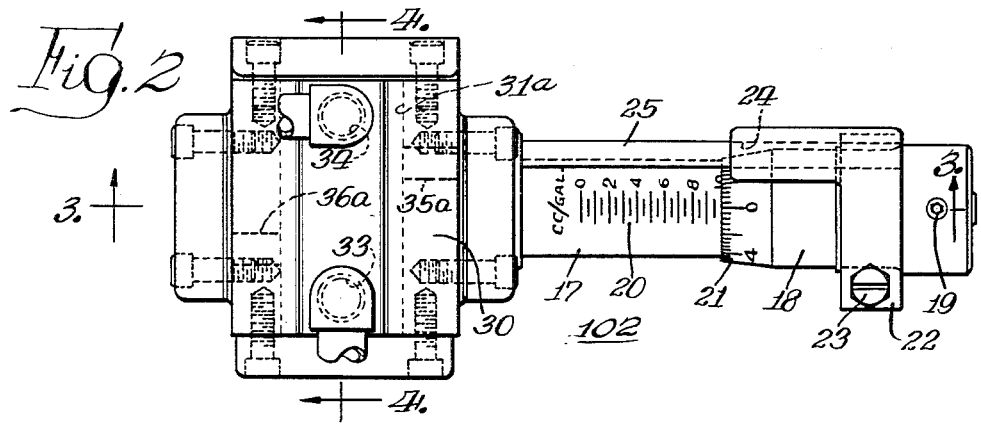
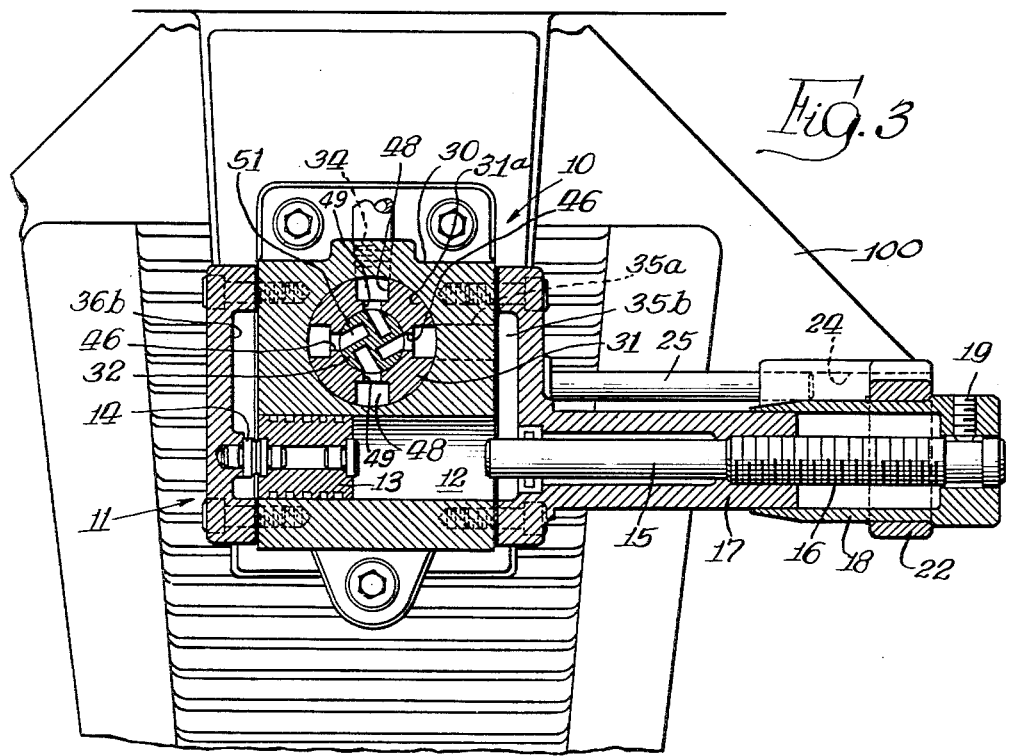
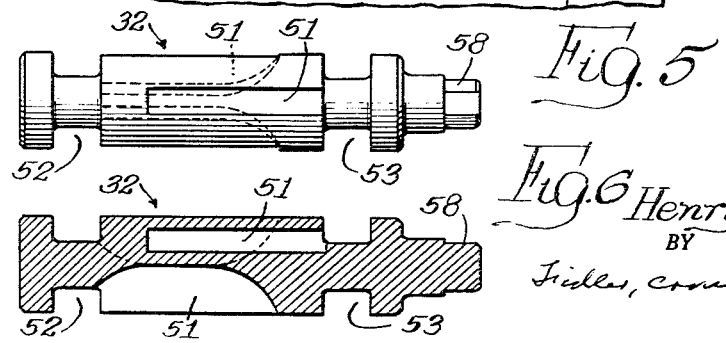
INVENTOR.
Henry Robert Billeter
BY
Fidler, Crouse & Beadsley
Atty's.

June 14, 1960  H. R. BILLETER  2,940,460
LIQUID FLOW CONTROL DEVICES
Filed Nov. 6, 1956  3 Sheets-Sheet 3
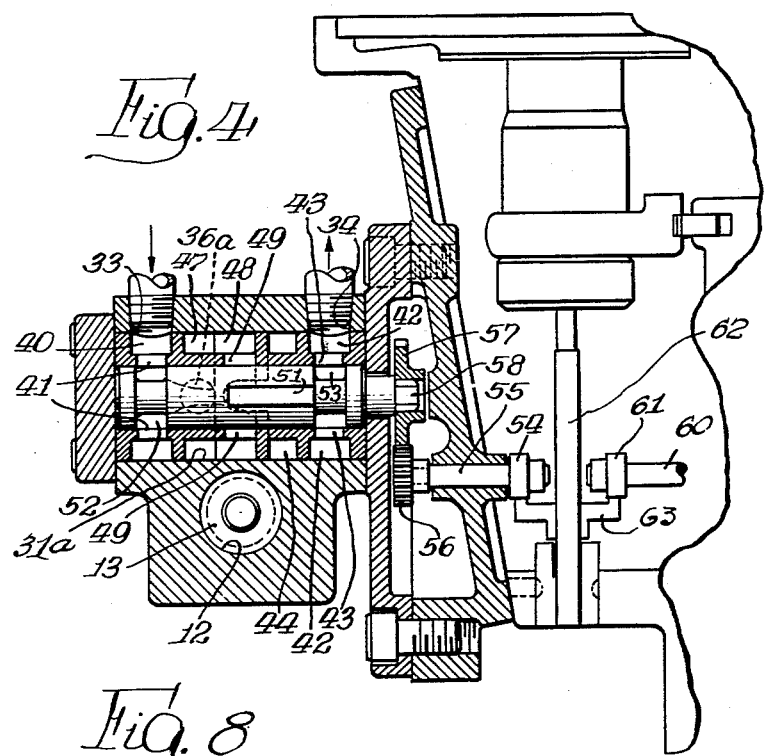
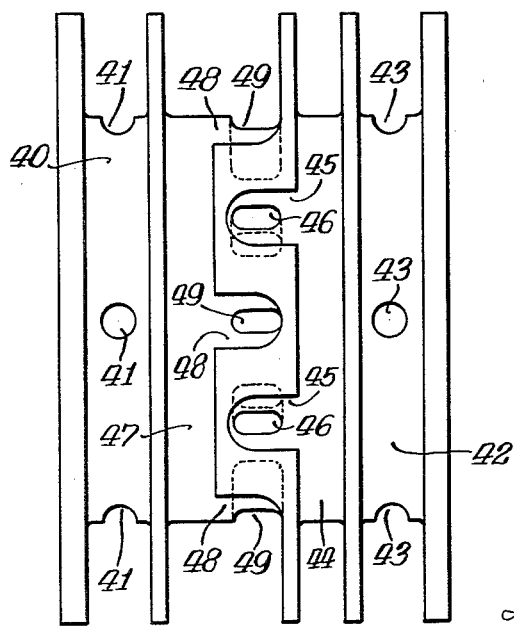
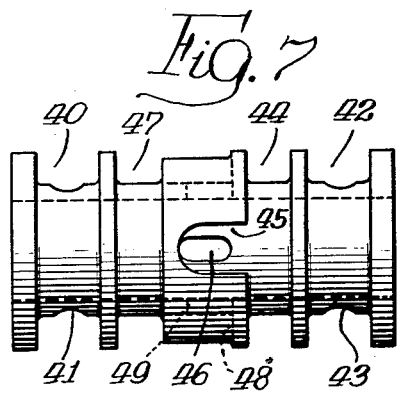
INVENTOR.
Henry Robert Billeter,
BY

United States Patent Office

2,940,460
Patented June 14, 1960

2,940,460

LIQUID FLOW CONTROL DEVICES

Henry Robert Billeter, Deerfield, Ill., assignor to Liquid Controls Corporation, North Chicago, Ill., a corporation of Illinois Filed Nov. 6, 1956, Ser. No. 620,760

11 Claims. (Cl. 137—99.5)

This invention relates to liquid flow control devices and has to do more particularly with apparatus for providing a predetermined secondary flow of a liquid at a rate proportioned to the rate of flow of a primary flow of the same or another liquid.

The apparatus of the present invention, in one embodiment thereof, is especially well adapted for use as a blender for injecting of blending a liquid additive into a primary liquid in proportion to the volume flow of the latter. The apparatus, in another embodiment, is applicable for use as a sampler for taking a sample from a flowing primary liquid, the volume of small increments of the sample being proportional to the volume of corresponding increments of the primary liquid flowing for the period during which the sample is taken.

One common use of additives is in connection with gasoline used as a motor fuel. Additives such as rust inhibitors, anti-knock materials, lubricants, neutralizers for deposits on spark plugs, and the like, are commonly added to gasoline to improve the performance thereof. Such additives are injected into and blended with the gasoline in predetermined volumetric proportions, as, for example, on the basis of a predetermined number of cubic centimeters of additive per gallon of gasoline.

In order to obtain the desired blending of the additive, or secondary liquid, with the gasoline, or other primary liquid, the additive is often injected continuously into the gasoline while the latter is flowing, as, for example, when it is being pumped from a tank car or truck to a storage tank, or vice versa. Such blending has often been effected heretofore by pumping the gasoline at a constant, predetermined rate and by pumping the additive at a constant rate into the flowing gasoline, which rate is predetermined to provide a flow of additive such as to produce the desired proportioning thereof to the volume of gasoline. This mode of blending an additive requires very careful control over the rate of flow of both the primary liquid and the additive. Such control not only is difficult and expensive to maintain but often cannot be exercised to the extent necessary to give the desired degree of accuracy of blending.

Another method of blending an additive to a primary liquid is the batch method wherein a measured quantity of additive is added to a measure quantity of the primary liquid. This has the disadvantage of requiring a very accurate measurement of both the primary liquid and the additive. Moreover, unless some means is provided for thoroughly mixing the liquids, the mixture will not be uniform.

Still another method of blending liquids involves the use of a venturi device whereby the additive is drawn into the flowing primary liquid by the suction exerted by the latter. This method of blending is not entirely satisfactory since the rate of flow of the additive does not vary in exact proportions to the variations in the rate of flow of the primary liquid and consequently a change in the rate of flow will change the proportion of secondary liquid drawn into the stream of primary liquid.

In still another system a proportional pump is used wherein there are two pumping means each consisting of a piston type pump and wherein the piston of the pump means for the primary liquid is mechanically connected to the piston of the pump means for the secondary liquid. The ratio of flow of the secondary liquid is controlled either by adjustment of the mechanical connection between the two pistons or by adjusting the length of the stroke of the secondary piston or by adjusting the relative position between the location of the outlet parts of the secondary pumping means and the end of the piston. In any event there is a mechanical connection between the displacement elements (pistons) of the primary and secondary displacement means. Such apparatus would not be suitable for use in certain applications as for example one where the primary flow is used to actuate a meter.

An object of the invention is to provide liquid flow control apparatus for providing a secondary or dependent flow of a liquid accurately predetermined in proportion to a primary flow of the same or a different liquid.

Another object is to provide a proportioning device for use either in apparatus for blending a secondary liquid with a primary liquid, or in apparatus for taking a sample in an accurately predetermined proportion, which device is simple in construction and positive in operation.

Another object is to provide a proportioning device for use either in apparatus for blending a secondary liquid with a primary liquid, or in apparatus for taking a sample of the primary liquid, which device is controlled by the flow of the primary liquid and which accurately injects into the flowing primary liquid the additive or secondary liquid or takes a sample from the primary liquid at a rate proportional to the rate of flow of the primary liquid.

Still another object of the present invention is to provide flow control apparatus for effecting a secondary flow of liquid at a rate proportional to a primary flow of the same or a different liquid which apparatus embodies a primary displacement device of the positive displacement type which is actuated by the flow of the primary liquid and a secondary displacement device and which positively limits the flow of the secondary liquid to a flow which is a predetermined portion of the flow of primary liquid, without interfering with the operation of the primary displacement device.

Another object is to provide flow control apparatus for providing a secondary flow of a liquid at a rate proportional to a primary flow of the same or a different liquid, which apparatus embodies a primary, positive displacement device which is actuated by the volume flow of the primary liquid and a secondary positively limited displacement device which is actuated by and in accordance with operation of the primary displacement device for controlling the secondary flow of liquid proportional to the rate of flow of the primary liquid.

A further object is to provide a proportioning device of the above character which effects a predetermined flow of measured increments of a secondary liquid in accordance with the primary flow of the same or a different liquid.

Another object is to provide a proportioning device for use either in apparatus for blending a secondary liquid with a primary liquid, or in apparatus for taking a sample of the primary liquid in proportion to the volume flow thereof, which device is driven by a liquid displacement device operated by the flow of primary liquid and which device imposes a minimum load on the driving device.

Another object is to provide a proportioning device of the above character embodying reciprocating displacement means actuated by the flow of liquid therethrough and a rotary valve for controlling the rate of flow of liquid through the reciprocating means in accordance with the rate of rotation of the rotary means.

Another object is to provide an improved rotary valve for use in apparatus such as that described above, which valve has two axially extending grooves for simultaneously conducting liquid additive under pressure to or from a displacement device whereby the pressure applied to such valve apparatus by such liquid additive is balanced.

Another object is to provide an improved rotary valve of the character described above having grooves of particularly large cross section for a given size of valve, which grooves are nevertheless formable by a simple machining operation.

Another object is to provide improved apparatus of the character described above which is efficient, reliable, and economical to manufacture.

This invention, together with further objects and advantages thereof, will best be understood by reference to the following description taken in connection with the accompanying drawings, and its scope will be pointed out in the appended claims.

In the drawings, in which like parts are designated by like reference numerals:

Fig. 2 is an enlarged, plan view of a proportioning device forming a portion of the apparatus of Fig. 1;

Fig. 3 is a vertical, cross-sectional view taken along line 3—3 of Fig. 2;

Fig. 4 is a vertical cross-sectional view of the device taken along line 4—4 of Fig. 2;

Fig. 5 is a side view of a valve rotor incorporated in the device of Fig. 2;

Fig. 6 is a longitudinal sectional view of the rotor of Fig. 5;

Fig. 7 is an elevational view of a valve bushing employed in the device of Fig. 2;

Fig. 8 is a developed view of the cylindrical surface of the bushing of Fig. 7.

For the purposes of illustration the invention has been shown and described, in the first embodiment, in connection with apparatus especially well adapted for blending a liquid additive into a primary liquid such as gasoline; and in the second embodiment in connection with apparatus well adapted for taking samples of a liquid such as gasoline. However, it will be understood that the invention is not limited to such applications but may be employed in many other uses to which it is applicable.

Figure 1:
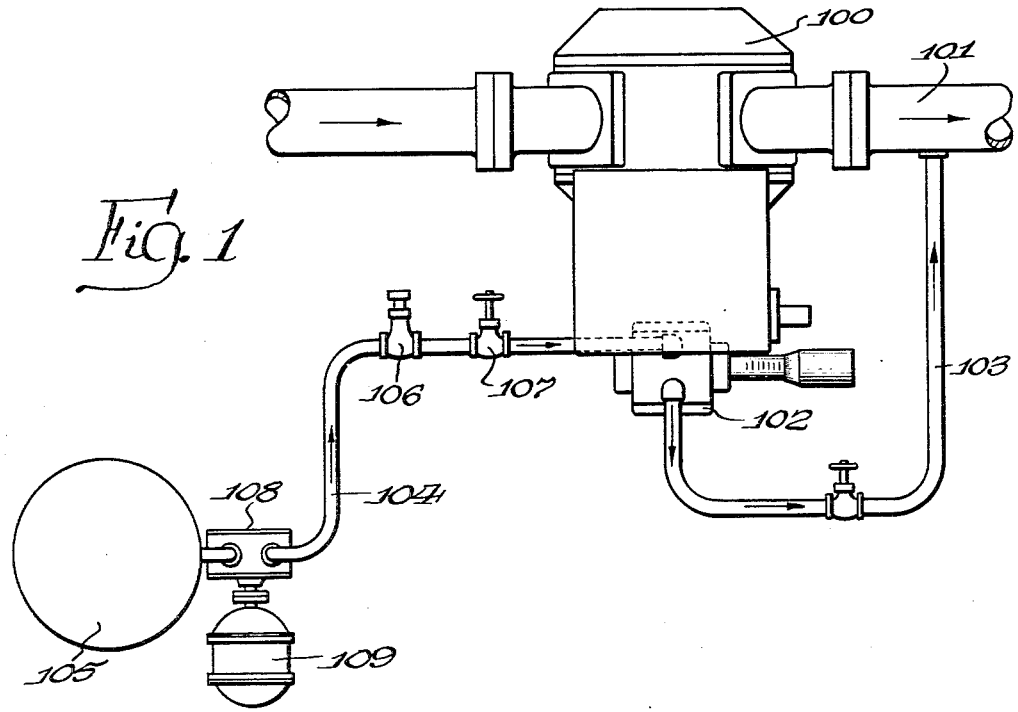
Figure 1 is a diagrammatic plan view of blending apparatus constructed in accordance with a preferred embodiment of the invention.
Figure 9:
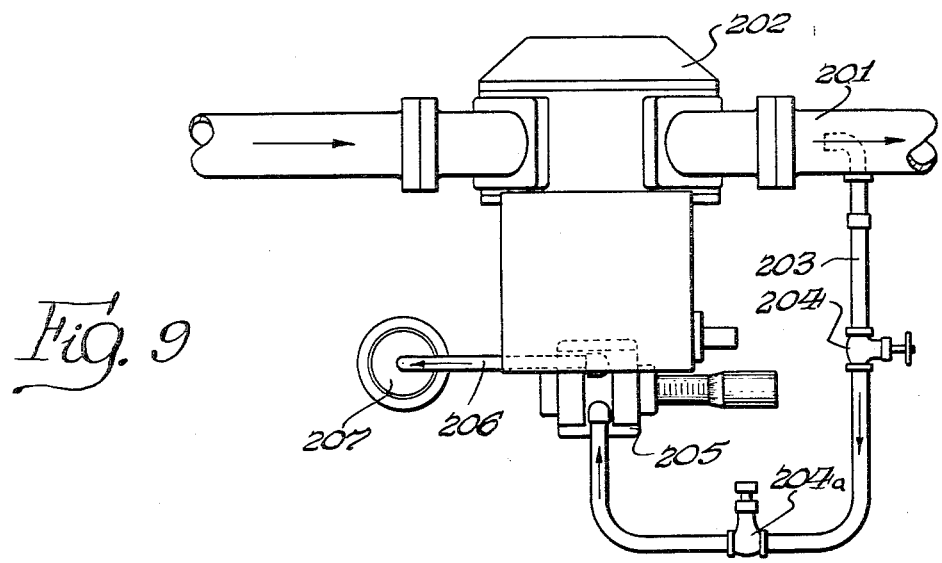
Fig. 9 is a diagrammatic plan view of sampling apparatus constructed in accordance with a second embodiment of the invention.

Referring now to Fig. 1 the apparatus includes a first or primary, liquid displacement device 100, which is of the positive displacement type connected in a line conduit 101 through which the gasoline is pumped or otherwise caused to flow from one container to another, as, for example, between a tank car or tank and a stationary tank, or vice versa. In the preferred embodiment the liquid displacement device 100 is a meter of the rotary positive liquid displacement type. The details of the meter are not shown since any known form of suitable meter may be used which is of the rotary positive displacement type or which effects rotation of a shaft, or the like, accurately in accordance with the volume flow of the gasoline—in other words a meter which rotates the shaft one revolution upon the passage through the meter of each, similar predetermined volume increment of the liquid.

A secondary, positively limiting displacement device 102 or proportioning device hereinafter described more in detail is connected in driven relation to the meter 100 in a manner hereinafter explained for actuation thereby. Since the proportioning device 102 in this embodiment is used as an element of the blending apparatus, it is sometimes known as a "blender." However, since the same device may also be employed without change as an element of the sampling apparatus hereinafter described it also sometimes is known as a "sampler."

The blender 102 is connected hydraulically to the line conduit 101, as by a pipe 103, on the downstream side of the meter 100 in which pipe a valve preferably is provided.

The blender 102 also is connected hydraulically, as by a pipe 104, to a container 105 for the additive, in which pipe 104 is connected a pressure regulator 106 and a valve 107. A pump 108 suitably driven, as by an electric motor 109, is connected in the line 104 for causing the additive to flow from the container 105 through the blender 102 to the line conduit 101. However, if desired, the container 105 may be suitably pressurized in a known manner, as by a compressed, inert gas, in which case the pump may be dispensed with. For reasons hereinafter explained it is essential that the liquid be maintained under sufficient pressure to cause the necessary volume flow thereof through the blender.

The blender 102 includes a rotary valve mechanism 10 (see Fig. 3) and a measured displacement means 11. As is explained in detail below, the valve mechanism 10 when in one position permits the flow of a liquid additive under pressure from the pipe 104 to one end of the positive displacement means 11. At the same time, it connects the other end of the displacement means 11 to the pipe 103. The pressure of the additive moving into one end of the displacement means operates to force the additive out of the other end of the device and into the pipe 103. When the valve mechanism rotates 90° the other end of the displacement means is connected to the pipe 104 while the first end thereof is connected to the pipe 103, with the result that the additive present in the first end of the device is forced into the gasoline line 101. It will be apparent that upon each 90° revolution of the valve, a given charge of additive will be forced into the gasoline. Since the valve is driven by metering apparatus responsive to the flow of gasoline, as will appear hereinafter, measured charges of the additive will be allowed to flow into the gasoline at a rate proportional to the flow of gasoline, and a desired concentration of the additive will be obtained.

The displacement means 11 includes a cylinder 12 and a free floating piston 13 slidably movable within the cylinder, all as best seen in Fig. 3. A fixed stop member 14 is provided for limiting movement of the piston 13 in one direction (to the left as seen in Fig. 3) and an adjustable stop member 15 is provided for limiting movement of the piston in the other direction (to the right as seen in Fig. 3). The adjustable stop member 15 has a threaded portion 16 which threadedly engages a fixed member 17. It will be apparent that as the adjustable stop member 15 is turned it will be moved to the left or to the right to adjust the permissible stroke of the piston 13 and accordingly the displacement of the fluid on each side of the piston 13.

A sleeve 18 is adjustably secured to the outer (right-hand) end of the stop member 15 by a set screw 19, the inner (left-hand) end of the sleeve 18 cooperating with calibrations 20 on the fixed member 17, as seen in Fig. 2. These calibrations indicate the setting of the adjustable stop member 15 and hence the length of the stroke of the piston 13 and the displacement resulting from movement of the piston along its permissible stroke. Calibrations 21 on the sleeve 18 permit more accurate reading of the displacement setting. Proper setting of the calibrations 21 relative to the calibrations 20 can be obtained by loosening set screw 19 and rotating the sleeve 18 with respect to the adjustable stop 15.

Preferably the sleeve 18 and the adjustable stop 15 are normally locked in position such that they can not be caused to rotate under the influence of repeated tapping of the piston 13 against the adjustable stop 15. For this purpose a split ring 22 is arranged around the sleeve 18 and has a screw 23 suitably arranged to tighten the split ring on the sleeve 18. The split ring 20 has a bored hole 24 therein for slidably receiving a fixed rod 25. It will be apparent that the rod 25 prevents rotation of the split ring 22 about the axis of the adjustable stop 15 and that tightening of the screw 23 causes the split ring to clamp the sleeve 18 and hence the adjustable stop 15 in a set position.

It will now be seen that the piston 13, and the cylinder 12 within which the piston freely slides, in cooperation with the fixed stop 14 and the adjustable stop 15 constitute a displacement device of adjustable displacement. Each time that the piston moves from the fixed stop 14 to the adjustable stop 15 or from the adjustable stop to the fixed stop it allows the passage of a positively limited volume of liquid which is controllable by adjustment of the adjustable stop 15.

The rotary valve mechanism 10 includes a valve body 30, a valve bushing 31, and a rotary valve 32. The valve body includes an opening 33 (seen in Figs. 2 and 4) which is connected to the container 105 of the liquid additive. Another opening 34 is connected to the pipe 103, which, as above stated is connected to the conduit 101 through which the primary liquid is flowing. The body 30 also has a passage formed by a bore 35a and by an opening 35b (seen in Fig. 3) leading to one end of the displacement means 11. Another passage formed by a bore 36a and by an opening 36b (which may be seen in Figs. 2, 3 and 4) leads to the other end of the displacement device.

The bushing 31 includes an annular channel 40 (seen in Figs. 4, 7 and 8) which permits the flow of the liquid additive from the opening 33 to a pair of ports 41 in the bushing 31. A similar annular channel 42 at the other end of the bushing 31 permits the flow of the liquid additive from a pair of ports 43 to the opening 34 in the bushing 31.

The central portion of the bushing 31 includes a pair of annular channels each of which has a pair of axial extensions which reach to the longitudinal center of the bushing. One of these channels 44 (best seen in Fig. 8) includes extensions 45, and a pair of ports 46 which extend radially inward from these channel extensions. Another channel 47 includes similar channel extensions 48 in which there are a pair of ports 49. It will be seen that the ports 46 are diametrically opposed and the ports 49 are diametrically opposed, and that the ports 46 are centered 90° from the adjacent ports 49. In Fig. 4, a cross section is shown through the channel extensions 48 and the ports 49. Fig. 4 also illustrates that the channel 47 opens into the channel 36a and 36b in the body, which leads to the left-hand end of the positive displacement device as viewed in Fig. 2. Similarly the channel 44 opens into the channel 35a and 35b in the body 30 which leads to the right-hand end of the positive displacement device as viewed in Fig. 3.

The valve 32 may be seen in Fig. 3 to have longitudinally extending grooves 51. Two of these grooves, on opposite sides of the valve, open into an annular groove 52 at the left-hand end of the valve as viewed in Fig. 6. The other two longitudinally extending grooves open into another annular groove 53 at the right-hand end of the valve. As may be seen in Figs. 5 and 6, those two longitudinally extending grooves 51 which open into the annular groove 52 terminate short of the annular groove 53. Similarly the other two longitudinally extending grooves 51 which open into the annular groove 53 terminate short of the annular groove 52.

In Figs. 3 and 4, one of the longitudinally extending grooves 51 is seen in a position to connect the annular groove 53 to one of the ports 46 in the valve bushing 31. It will be understood that the longitudinally extending groove 51 which is opposite the illustrated groove also connects to the annular groove 53 and is in a position to open into the other of the ports 46. In this position of the valve the opening 34 leads to the annular channel 42 and the ports 43 in the valve bushing, to the annular groove 53 and two of the longitudinally extending grooves 51 of the valve, to the ports 46 and the annular channel 44 of the bushing, and from there to the channel 35a and 35b in the valve body which leads to the right-hand end of the positive displacement device 11. The other two longitudinally extending grooves 51, which open into the annular groove 52, are in position to open into the two ports 49 in the valve bushing. Accordingly the opening 33, which is connected to the source of liquid additive, leads to the annular channel 40 and the ports 41 of the bushing, the annular groove 52 and two of the longitudinally extending grooves 51 of the valve, the ports 49 and the annular channel 47 of the bushing, and the channel 36a and 36b of the valve body which leads to the left-hand end of the positive displacement device 11. It will thus be seen that with the valve in the illustrated position, the liquid additive will enter the opening 33 and pass to the left-hand end of the displacement device 11 to force the piston 13 to the right and against the adjustable stop 15. At the same time the liquid additive present in the right of the piston is forced out through the opening 34 and into the conduit or other container of the bulk liquid.

It will further be seen that when the valve 32 rotates through an angle of 90° those longitudinally extending grooves 51 which previously were associated with the ports 46 will become associated with the ports 49 whereby the outlet opening 34 is connected to the left-hand end of the displacement device 11. Similarly those longitudinally extending grooves 51 which were previously connected to the ports 49 will become associated with the ports 46 whereby the inlet opening 33 will connect to the right-hand end of the displacement device 11. Under these conditions the pressure of the liquid additive from the supply source will force the piston 13 to the left, as viewed in Fig. 2, and the liquid additive at the left thereof will be forced out through the opening 34 and into the bulk liquid container. Accordingly each time that the valve 32 rotates through 90° a predetermined charge of the additive is forced into the bulk liquid. A desired ratio of the additive to bulk liquid may be obtained by driving the valve 32 at a speed proportional to the flow of bulk liquid past a given point.

The meter 100 drives a shaft 60 to which a suitable gear 61 is secured, all as seen in Fig. 4. The gear 61 drives a gear 63 which is secured to a shaft 62. The shaft 62 may, if desired, be employed to drive a register (not shown) which indicates the volumetric flow of the primary liquid.

Also engaging the gear 63 is a gear 54 similar to the gear 61 and secured to the right-hand end of a shaft 55. A gear 56 secured to the left-hand end of the shaft 55 engages a gear 57 which is secured to a shaft extension 58 of the valve 32. By this means the valve 32 is made to rotate in accordance with the rotation of the meter 100 and hence at a rate proportional to the rate of flow of the gasoline. Accordingly the rate of injection of the liquid additive into the gasoline is proportional to the flow of gasoline, whereby a predetermined ratio of liquid additive to gasoline is obtained.

An important characteristic of a volume flow meter such as that conventionally employed to drive a register is that its accuracy decreases materially when any appreciable load is applied thereto. Great care is taken, for example, to construct registers in such a way that they impose only a very light load on the associated meter. Accordingly, it is of great importance that the blending apparatus constituting the present invention also be made to impose as light a load as possible on the meter which drives it. In the illustrated application of the apparatus any substantial resistance to movement of the valve 32 imposes a load on the meter, and would not only reduce the rate of injection of the liquid additive but would also cause inaccuracies in the meter.

An important characteristic of the illustrated embodiment of the invention is that the pressure of the liquid additive against the valve 32 is always balanced. The liquid additive as it comes from its source and through the opening 33 is introduced into the annular groove 52 and from there passes into two diametrically opposed longitudinally extending channels 51. Accordingly the pressure applied to the valve by this liquid additive is in exact balance, and this in turn means that the valve 32 is not forced against one side of the bushing 31 thereby but instead floats freely therein. Similarly the liquid additive being ejected by the displacement device 11 also exerts balanced forces on the valve since it is present in two diametrically opposed ones of the longitudinally extending grooves 51 and in the annular groove 53. Friction between the valve 32 and the bushing 31 is thereby maintained at a minimum since no significant pressure therebetween is caused by the liquid additive passing therethrough.

It should be noted that any resistance to movement of the piston 13 within the cylinder 12 does not impose a load on the meter since the energy required to move the piston back and forth is derived from the pressure on the additive. It will of course be understood that the liquid additive should be supplied under a sufficient pressure to force the additive through the necessary piping and through the valve mechanism 10, and to drive the piston 13 in either direction, all with sufficient speed that the piston moves through its complete stroke during each 90° of rotation of the valve 32.

It is also desirable that the valve 32 be reasonably small in diameter in the interest of economy and in order to reduce the area of contact between it and the bushing 31, while still providing sufficient cross-sectional area of the longitudinal extending grooves 51 to permit ready flow of the additive therethrough at a reasonable speed. In the preferred embodiment of the invention these objectives are obtained by so orienting the longitudinally extending grooves with respect to the valve that the bottoms of the grooves are substantially displaced laterally, each in the same sense, from the axis of the valve. By so displacing the bottoms of these grooves it is possible for the grooves to extend to a depth substantially equal to the radius of the valve without conflicting with each other. It will be noted in fact that there is relatively little material remaining other than thin walls separating the grooves one from another. At the same time it may be seen that the grooves are rectangular in cross section whereby they may be formed by the simplest type of machining operation.

In the operation of the blending apparatus the primary liquid is caused to flow in the line 101 and through the meter 100. This effects rotation of the rotor or rotors (not shown) of the meter 100 which drives the connecting shaft 60 to rotate the valve of the blender as above described. Additive from the container 105 passes through the blender 102 in the manner above described and causes it to flow therefrom to the line 101 through the pipe 103 in measured increments which correspond in number to the volume of increments of primary liquid passing through the pipe 101. Thus during any predetermined period of operation additive is allowed to flow from the container 105 into the line 101 in a volume bearing a predetermined proportional relationship to the volume of primary liquid which flows through line 101 during that period.

The proportioning device of the present invention which has been described above in connection with its use as a blender is equally well adapted for use as a sampler. It is often desirable to be able to take a sample of a primary liquid which will truly reflect the composition of the latter. Where the primary liquid is not of uniform composition thereof it is difficult to obtain a truly representative sample by any apparatus heretofore known. In accordance with the present invention the primary liquid is caused to flow and a sample taken therefrom by removing from the primary liquid a sample consisting of a plurality of small, equal increments each of which is taken from and is exactly proportional in volume to the volume of one of a plurality of small equal increments of the primary liquid.

To the foregoing end, the primary liquid is caused to flow through a line 201 having therein a positive liquid displacement device 202 having the characteristics described in connection with the meter 100 and which may be identical therewith. Liquid from the line 201 is withdrawn therefrom by a pipe 203 which may have a valve 204 and a pressure regulator 204a therein, which pipe leads to a proportioning device or sampler 205 which preferably is identical with the blender 102. Leading from the sampler 205 is a pipe 206 which discharges into a receptacle 207 for receiving the sample.

In the operation of the sampling apparatus, the primary liquid is caused to flow in the line 201 and through the meter 202. This effects rotation of the rotor or rotors (not shown) of the meter, which drives the connected shaft (similar to shaft 60 in Fig. 4) to rotate the valve of the proportioning device sampler 205. Primary liquid from the line 201 passes through the sampler 205 to the container 207 in a manner similar to that described in connection with the blender, the number of volume increments of such liquid corresponding to the number of volume increments of primary liquid which pass through the meter 202 during the corresponding period. Thus, during any period of operation the increments of liquid which are withdrawn from the line and passed to the receptacle 207 correspond to the increments of primary liquid which pass through the meter 202. Accordingly, the sample which is taken and which is collected in the receptacle 207 corresponds in composition to the aggregate of the liquid which has passed through the meter during the sampling period.

The secondary displacement device serves to positively limit each increment of liquid discharged therefrom to predetermined equal volumes, the rate of discharge of such increments being controlled by the valve driving means which in the present case is the primary liquid displacement device. It will be appreciated that the displacement means of the secondary displacement device is not connected mechanically to the primary displacement device and therefore does not act to pump liquid. Instead the displacement means is actuated by the secondary flow of liquid. Thus, it is essential to the proper functioning of the device that sufficient liquid be supplied to the secondary displacement device to insure that a full increment of liquid is discharged upon each stroke of the displacement means. In the present case, this is effected by maintaining sufficient pressure on the liquid supplied to the secondary displacement device.

It will be seen that when the secondary displacement device is functioning as intended it allows measured increments of the desired volume to be discharged therefrom at the desired rate so that the secondary flow is in a predetermined proportion to the primary flow. Accordingly, the secondary device may be termed a "positively limiting liquid displacement device," or a "controlled escape device for liquids."

Since the secondary displacement device is not connected mechanically to the primary displacement device, any insufficiency of flow of the liquid through the former will not affect the operation of the primary device. Thus, where the latter is a meter, its accuracy will not be affected even though the secondary device may fail to function as desired.

Apparatus has been described above for blending or injecting a liquid additive into or taking a sample of a primary liquid in proportion to volume flow of the primary liquid. The particular embodiment of the invention disclosed may be seen to be inherently sensitive and accurate. The apparatus furthermore imposes the lightest of loads on the driving apparatus such that the driving apparatus is not substantially retarded thereby. More particularly the proportioning device may be driven by a meter which is responsive to the flow of the primary liquid and which may also drive a register which records the flow of the primary liquid. Because of the fact that the blending apparatus imposes only a very light load on the driving apparatus, no separate driving apparatus need be provided. The lightness of the load imposed upon the driving apparatus results from the balancing of pressures on the valve mechanism and the provision for the positive displacement device to be driven by the pressure of the liquid additive. Still further, a novel form of rotary valve is disclosed wherein liquid conducting grooves may be formed by the simplest of machining operations and at the same time the grooves are so oriented as to provide a maximum liquid conducting cross-sectional area.

It will be apparent that the invention may be varied in its physical embodiment without departing from the spirit of the invention, and it is desired, therefore, that the invention be limited only by the scope of the appended claims.

The invention having thus been described, what is claimed and desired to be secured by Letters Patent is:

1. A liquid flow control device comprising a first conduit, a positive liquid displacement device connected in said first conduit, a second conduit connected at one end only to said first conduit, means connected to said second conduit for producing a liquid flow therein, a proportioning device including displacement means actuated solely by the flow therethrough of liquid in said second conduit, for controlling the rate of flow of liquid through said second conduit, and means including an hydraulically balanced, rotary valve mechanism including a valve body connected in said second conduit and a rotary valve in said valve body for controlling the rate of actuation of said displacement means, and driving means connecting said liquid displacement device and said rotary valve for actuating said displacement means to limit the flow of liquid through said second conduit to a rate proportional to the rate of flow of liquid through said first conduit.

2. A liquid flow control device comprising a first conduit for a first liquid flow, a second conduit for a second liquid flow connected at one end only to said first conduit, means connected to said second conduit for producing liquid flow therein, a valve chamber having inlet and outlet openings connected to said second conduit, a cylinder having a double-ended free-floating piston slidable therein and connected at opposite ends only to said valve chamber, means including an hydraulically balanced, rotary valve in said chamber for first connecting a first end of said cylinder to a first of said openings and the other end to the second of said openings and then connecting the first end of said cylinder to said second opening and the second end of said cylinder to said first opening, and means actuated by the flow of liquid in said first conduit for rotating said rotary valve at a rate corresponding to the rate of flow of liquid in said first conduit.

3. In apparatus for controlling a secondary flow of a liquid in proportion to a primary flow of liquid, said apparatus including a first conduit for the primary flow, a meter connected in said first conduit responsive to volume flow in said first conduit, a second conduit for the secondary flow, a proportioning device and means drivingly connecting said proportioning device and said meter, the improvement wherein said proportioning device comprises a cyclically operating double-ended liquid displacement means operable by the secondary flow of liquid under pressure alternately into opposite ends thereof, and rotary valve means comprising inner and outer cooperating valve members rotatable with respect to each other, said inner member being driven by said meter at a positive speed ratio with respect thereto, said valve members defining therebetween a pair of spaced apart annular passages each connected to said second conduit, said outer member defining a first pair of diametrically opposed ports connected in parallel to said liquid displacement means at one end thereof, and a second pair of diametrically opposed ports connected in parallel to said liquid displacement means at the other end thereof and circumferentially spaced from said first pair of ports, said inner valve member defining a first pair of diametrically opposed axially extending grooves opening into one of said annular passages and into alternate ones of said pairs of ports as it rotates and defining a second pair of diametrically opposed axially extending grooves circumferentially spaced from said first pair of axial grooves and opening into the other of said annular passages and into alternate ones of said pairs of ports as it rotates.

4. The invention claimed in claim 3 in which said inner valve member is generally cylindrical and said axially extending grooves are generally rectangular in cross section and are so oriented with respect to said inner valve member that the bottoms of said grooves are substantially displaced laterally, each in the same sense, from the axis of said inner valve member, each of said grooves extending to a depth at least as great as the radius of said inner valve member and without intersecting another of said grooves.

5. In apparatus for controlling a secondary flow of a liquid in proportion to a primary flow of liquid, said apparatus including a first conduit for the primary flow, a meter connected in said first conduit responsive to the volume of said primary flow, a second conduit for the secondary flow, a proportioning device, and means drivingly connecting said proportioning device and said meter, the improvement wherein said proportioning device comprises a cyclically operating double-ended positive displacement means including a cylinder and a piston freely movable axially therein, said piston being operable by the secondary flow of liquid under pressure alternately into opposite ends of said cylinder, and rotary valve means comprising inner and outer cooperating valve members rotatable with respect to each other, said inner member being driven by said meter at a positive speed ratio with respect thereto, said valve members defining therebetween a pair of spaced apart annular passages, said outer member defining two pairs of diametrically opposed ports each pair connected to said second conduit and opening into said passages respectively, a first pair of diametrically opposed ports connected in parallel to said cylinder on one side of said piston and a second pair of diametrically opposed ports connected in parallel to said cylinder on the other side of said piston and circumferentially spaced from said first pair of ports, said inner valve member defining a first pair of diametrically opposed axially extending grooves opening into one of said annular passages and into alternate ones of said pairs of ports as it rotates and defining a second pair of diametrically opposed axially extending grooves circumferentially spaced from said first pair of axial grooves and opening into the other of said annular passages and into alternate ones of said pairs of ports as it rotates.

6. The elements of claim 5 in which said inner valve member is generally cylindrical and has annular grooves adjacent each end providing said annular passage and said axially extending grooves are generally rectangular in cross section and are so oriented with respect to said inner valve member that the bottoms of said grooves are substantially displaced laterally, each in the same sense, from the axis of said inner valve member, each of said grooves extending to a depth at least as great as the radius of said inner valve member and without intersecting another of said grooves.

7. Apparatus for controlling a secondary flow of liquid in proportion to a primary flow of liquid, a first conduit for the primary flow, a positive liquid displacement device connected in said first conduit, a second conduit connected at one end only to said first conduit, means connected to said second conduit for effecting a liquid flow therein, a proportioning device including liquid displacement means actuated solely by the flow therethrough of liquid in said second conduit for limiting the flow of such liquid to equal, measured increments, means including an hydraulically balanced rotary valve connected in said second conduit and to said displacement means for controlling the rate of actuation thereof, and means connecting said valve to said liquid displacement device for rotation thereby at a rate proportional to the rate of actuation of said positive displacement device.

8. Apparatus for injecting a liquid additive into a flowing primary liquid comprising a conduit for the primary liquid, a positive displacement device connected in said primary conduit, a container for the additive, a secondary conduit connected at one end to said container and the other to said primary conduit, means energized independently of the flow in said primary conduit for effecting a flow of the additive from said container through said secondary conduit into said primary conduit, a blender device including liquid displacement means connected in said secondary conduit and actuated solely by the flow of additive therethrough for limiting such flow to equal measured increments, and means including an hydraulically balanced rotary valve for controlling the rate of actuation of said displacement means, and means connecting said valve to said positive displacement device for rotation thereby at a rate proportional to the rate of actuation of said positive displacement device.

9. Apparatus for removing a sample from a flowing primary liquid comprising a first conduit for the primary liquid, a positive liquid displacement device connected in said first conduit, a second conduit connected at one end to said first conduit and at the other end to a container for receiving liquid flowing through said second conduit, means connected to said second conduit for effecting a flow of liquid from said first conduit through said secondary conduit for said container, a sampler device including liquid displacement means connected in said second conduit and actuated solely by the flow therethrough of liquid in said second conduit from said first conduit to said container for limiting such flow to equal measured increments, and means including an hydraulically balanced rotary valve for controlling the rate of actuation of said displacement means, and means connecting said valve to said positive displacement device for rotation thereby at a rate proportional to the rate of actuation of said positive displacement means.

10. In a liquid flow control device including a first conduit, a positive liquid displacement device connected in said first conduit, a second conduit connected at one end only to said first conduit, means for producing a liquid flow in said second conduit, a proportioning device and means drivingly connecting said positive liquid displacement device and said proportioning device, the improvement wherein said proportioning device includes displacement means connected to said second conduit and actuated solely by the flow therethrough of liquid in said second conduit for controlling the rate of flow of liquid through said second conduit and means for controlling the rate of actuation of said displacement means including a valve housing having a valve chamber therein, with a pair of diametrically opposed inlet ports and a pair of diametrically opposed outlet ports opening thereinto, said pairs of ports being connected respectively to said second conduit, two pairs of diametrically opposed intermediate ports communicating with said valve chamber and the ports of each pair being connected in parallel to said displacement means and a rotary valve member in said chamber having two pairs of diametrically opposed passages therein, one pair positioned to connect said inlet ports and said pairs of intermediate ports alternately, and the other pair of passages positioned to connect said outlet ports and said pairs of intermediate ports alternately.

11. A liquid flow control device comprising a cylinder, a double-ended, free-floating piston slidable in said cylinder, rotary valve means including a valve housing having a valve chamber therein, with a pair of diametrically opposed inlet ports and a pair of diametrically opposed outlet ports opening thereinto, two pairs of diametrically opposed intermediate ports communicating with said valve chamber and connected to said cylinder on opposite sides of said piston, respectively, the ports of each pair being connected in parallel to said cylinder, and a rotary valve member in said chamber having two pairs of diametrically opposed passages therein, one pair of passages positioned to simultaneously connect said inlet ports and one pair of said intermediate ports and to simultaneously connect said outlet ports and the other pair of intermediate ports in one position of said rotary valve member, and the other pair of passages positioned to simultaneously connect said one pair of intermediate ports and said outlet ports and to simultaneously connect said inlet ports and said other pair of intermediate ports in another position of said rotary valve member.

References Cited in the file of this patent

UNITED STATES PATENTS

| | | |
|---|---|---|
| 1,223,021 | Allen | Apr. 17, 1917 |
| 2,218,393 | Corydon | Oct. 15, 1940 |
| 2,238,747 | Ornstein | Apr. 15, 1941 |
| 2,837,105 | Henke | June 3, 1958 |